Patented Oct. 10, 1939

2,175,334

UNITED STATES PATENT OFFICE 2,175,334

PROCESS FOR OBTAINING A SUBSTANCE LOWERING THE BLOOD PRESSURE

Ernst Wollheim, Berlin-Charlottenburg, Germany

No Drawing. Application June 22, 1937, Serial No. 149,793. In Germany June 23, 1936

7 Claims. (Cl. 167—74)

In an earlier copending application 111,557, filed Nov. 18, 1936 applicant has stated, that from urine a substance lowering the blood pressure can be obtained. Now I have found that this active substance can be obtained also from the pituitary gland and particularly from its posterior lobe. For this purpose, according to the present invention, extracting with glacial or diluted acetic acid is used, a method already proposed for obtaining substances increasing the blood pressure and causing uterine contraction. But whereas in order to obtain the two last named hormones from the acetic acid extract, the hormone increasing the blood pressure is precipitated and separated by means of ether and that causing uterine contraction by means of petroleum ether, the active substance lowering the blood pressure remains dissolved in acetic acid when the said precipitations with ether and petroleum ether, respectively, are made. Thus it is possible to separate the last named substance from both said other hormones by treating with ethyl ether and petroleum ether the extract first obtained from the pituitary gland by means of acetic acid. These treatments may be executed either simultaneously or successively. If there is no interest in simultaneously obtaining and separating the hormones increasing the blood pressure and causing uterine contraction, the acetic acid extract suitably is treated directly with a mixture of ethyl ether and petroleum ether, whereas in the other case the precipitation of each of both said hormones is executed the one after the other, in the manner known per se.

The acid liquid left after having performed precipitation by means of ethyl ether and petroleum ether in accordance with present invention then is neutralized with alkali. A precipitate is formed thereby which contains the active substance lowering the blood pressure. This precipitate may either be used as it is, if desired dissolved in water, or it may be subjected to a further purification.

To attain such purification the precipitate obtained by the neutralization with alkali may first be treated with small quantities of water, thus dissolving and removing the acetic alkali salt. The remaining sediment then can be extracted with larger quantities of water, whereby the active substance is dissolved. Subsequently it may be purified further, for instance by deaminating according to methods already known.

The active substance lowering the blood pressure and obtained in the above indicated manner from the pituitary gland, just as that obtained from urine, possesses the property of being resistant to boiling (i. e., not injured by boiling). Thereby it is also made possible to separate it, if necessary, from other active agents, e. g., from the hormone increasing the blood pressure, which, as known, does not withstand boiling in acid solution. Such boiling may be performed in any stage of the process.

Example 100 grams of the posterior lobe of the pituitary gland of a beef or pork animal are repeatedly extracted with glacial acetic acid and the extracts thus obtained are precipitated with a mixture of ethyl and petroleum ethers. The strongly acid, thick and syrupy liquid, filtered off from the precipitate then is shaken with a quantity of sodium hydroxide, calculated to neutralize the quantity of glacial acetic acid employed, and this sodium hydroxide preferably is employed in the solid and powdered state. The sediment formed therein contains the desired active substance. To extract the formed sodium acetate it is mixed with only enough water to dissolve the said salt. The residue left after removal of the salt solution now is extracted with larger quantities of water, e. g., with one liter of water. Thereby the active substance is dissolved. This extract may be employed as it is, if desired after concentration, or it can further be purified by treatment with sodium nitrite and sulphuric acid, whereby "deaminating" is effected. This can be effected by other known methods. If desired, said solution may be boiled, in order to destroy any accompanying substances not able to withstand boiling.

The resulting active substance is insoluble in concentrated alcohol, acetone, ethyl ether and chloroform, but readily soluble in water, glacial acetic acid and in a trichloracetic acid of 10% content. It can not be dialysed, nor is it adsorbed by carbon; therefore it can readily be freed from salts by electrodialysis. It is digested by pepsin hydrochloric acid, but is not destroyed by trypsine.

The active substance lowering the blood pressure is found predominantly in the posterior lobe of the pituitary gland, whereas, as far as stated hitherto, the anterior lobe contains not more than very small quantities of it, but, nevertheless, it is obvious that for obtaining this active substance the whole pituitary gland may be worked up.

Having now particularly described and ascertained the nature of my said invention, I declare that what I claim is:

1. A process for preparing a substance capable of lowering the blood pressure, consisting of extracting pituitary gland material with acetic acid, treating the thus obtained solution with ethyl ether and petroleum ether, and separating the material precipitated thereby, neutralizing the remaining liquid whereby another precipitate is formed, and isolating such last mentioned precipitate.

2. A process according to claim 1, characterized in that a boiling up of the solution containing the desired active substance is performed during any stage of the process.

3. A process as in claim 1, in which the acetic acid is used in a highly concentrated state.

4. A process as in claim 1, in which the pituitary gland material employed consists essentially of the posterior lobe of the pituitary gland.

5. A process as in claim 1, in which the last mentioned precipitate is treated first with such an amount of water as can dissolve out the acetate formed by neutralization, and the residue is thereafter treated with water to dissolve the major part at least of the blood-pressure-lowering substance.

6. A process as in claim 1, in which the last mentioned precipitate is treated first with such an amount of water as can dissolve out the acetate formed by neutralization, and the residue is thereafter treated with water to dissolve the major part at least of the blood-pressure-lowering substance and deaminating the solution thereby produced.

7. A process as in claim 1, in which the last mentioned precipitate is treated first with such an amount of water as can dissolve out the acetate formed by neutralization, and the residue is thereafter treated with water to dissolve the major part at least of the blood-pressure-lowering substance and treating the solution with sulphuric acid and a nitrite.

ERNST WOLLHEIM.